(12) United States Patent
Christensen et al.

(10) Patent No.: US 9,001,925 B1
(45) Date of Patent: Apr. 7, 2015

(54) DIGITAL ARCHITECTURE FOR ENCODING A RETURN-TO-ZERO DIFFERENTIAL PHASE SHIFT KEYING WAVEFORM

(71) Applicant: L-3 Communications Corp., New York, NY (US)

(72) Inventors: L. Carl Christensen, South Jordan, UT (US); Bonnie A. Uresk, Farmington, UT (US); Justin D. Perry, Bountiful, UT (US); Michael D. Rivers, Farr West, UT (US); John L. Metz, Louisville, CO (US); Larry H. Steinhorst, Farmington, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 14/317,339

(22) Filed: Jun. 27, 2014

(51) Int. Cl.
*H04L 27/00* (2006.01)
*H04B 10/516* (2013.01)
*H04B 10/556* (2013.01)

(52) U.S. Cl.
CPC ........ *H04B 10/5162* (2013.01); *H04B 10/5561* (2013.01)

(58) Field of Classification Search
CPC .......... H03M 5/04; H03M 5/12; H04B 10/12; H04B 10/5162
USPC .......................................... 375/295
See application file for complete search history.

(56) References Cited

U.S. PATENT DOCUMENTS

| | | | |
|---|---|---|---|
| 6,559,996 B1 * | 5/2003 | Miyamoto et al. ............ | 398/183 |
| 7,312,909 B2 * | 12/2007 | Glingener et al. ............ | 398/98 |
| 2001/0043086 A1 * | 11/2001 | Idei et al. ........................ | 327/12 |

* cited by examiner

*Primary Examiner* — Don N Vo
(74) *Attorney, Agent, or Firm* — Kirton McConkie

(57) ABSTRACT

A return-to-zero control signal for controlling a modulator can be generated from two separate streams. A first data stream can include a pulse for each logical one that appears in an input data stream, while a second data stream can include a pulse for each logical zero that appears in the input data stream. The first and second data streams can be combined in a manner that yields the return-to-zero control signal. The first and second data streams can be generated in digital circuitry, such as an FPGA, to minimize the analog path for generating the return-to-zero control signal.

21 Claims, 15 Drawing Sheets

DIGITAL ARCHITECTURE FOR ENCODING A RETURN-TO-ZERO DIFFERENTIAL PHASE SHIFT KEYING WAVEFORM

BACKGROUND

An electro-optic modulator is a device that employs the electro-optic effect to modulate a beam of light. The electro-optic effect refers to the modification of a medium's refractive index which is caused by subjecting the medium to an electric field. In many common electro-optic modulators, the medium is a crystal that is positioned between a capacitor. A varying voltage is applied to the capacitor to vary the electric field experienced by the crystal thereby altering the refractive index of the crystal. As a result, as a beam of light (e.g. a laser) passes through the crystal, the variations in the refractive index cause the phase of the beam of light to be modulated. Also, to modulate the amplitude of a beam of light, an electro-optic modulator can include a Mach-Zehnder interferometer or other similar device.

It is common to use return-to-zero phase shift keying to modulate an optic signal. For example, return-to-zero differential phase shift keying (RZ-DPSK), return-to-zero binary phase shift keying (RZ-DPSK), return-to-zero quadrature phase shift keying (RZ-QPSK) could be used. Pulse position modulation may also be used.

FIG. 1 illustrates an example of a prior art circuit 100 for modulating an optic signal using RZ-DPSK. Circuit 100 employs two electro-optic modulators. First, as an optic signal is passed through a phase modulator, modulator 101, a data signal is input to modulator 101 to modulate the optic signal with the data. Then, the optic signal is passed through an amplitude modulator, modulator 102, where it is amplitude modulated with a clock giving the optic signal its return-to-zero characteristic. Three modulator architectures also exist to apply amplitude modulation at different clock rates for bursted RZ-DPSK waveforms.

The architecture of circuit 100 can be undesirable for many implementations. For example, because modulators 101 and 102 are relatively large components, the overall size of a system that employs circuit 100 can be unsuitable. The use of two modulators also adds cost to the system and reduces its reliability. Also, because two separate modulators are employed, there are stringent skew requirements to ensure that the clock is modulated in alignment with the previously modulated data.

SUMMARY

The present invention is generally directed to methods, circuits, and systems for encoding a RZ-DPSK waveform using a digital architecture. By employing a digital architecture, a single modulator can be employed to modulate an optic signal using a data signal with an embedded clock. This data signal with the embedded clock can be substantially generated within the digital architecture thereby minimizing the number of analog components required in the system. Also, because the clock is embedded within the data signal, and therefore applied to the optic signal at the same time as the data signal, there is no need to implement phase alignment outside of the digital architecture (i.e. within the analog path leading up to the electro-optic modulator). Additionally, the generation of all the timing signals for the waveform within the digital architecture allows easy and direct generation of non-continuous data pulses for burst-mode versions of the RZ-DPSK waveform.

In one embodiment, the present invention is implemented as a method for generating a return-to-zero control signal for controlling a modulator. An input data stream is received. A first data stream is generated from the input data stream, the first data stream including a pulse for each logical one that appears in the input data stream. A second data stream is also generated from the input data stream, the second data stream including a pulse for each logical zero that appears in the input data stream. The first data stream and the second data stream are combined to generate a third data stream, the third data stream having a first value for representing logical ones that appear in the input data stream, a second value for representing a zero value; and a third value for representing logical zeros that appear in the input data stream. The third data stream is then output as a return-to-zero control signal for controlling a modulator.

In another embodiment, the present invention is implemented as a system for generating a return-to-zero control signal for controlling an electro-optic modulator. The system includes an encoding block that is configured to receive an input data stream and generate a first data stream and a second data stream based on the input data stream. The first data stream includes a pulse for each logical one in the input data stream and the second data stream includes a pulse for each logical zero in the input data stream. The system also includes a combining block that is configured to receive the first and second data streams and generate a third data stream by combining the first and second data streams. The third data stream comprises a return-to-zero control signal for controlling a modulator.

In another embodiment, the present invention is implemented as a circuit for generating a return-to-zero control signal. The circuit includes an encoding block that outputs a first differential pair, including a first positive stream and a first negative stream, each representing a first data stream and a second differential pair, including a second positive stream and a second negative stream, each representing a second data stream. The first data stream includes a pulse for each logical one in an input data stream, and the second data stream includes a pulse for each logical zero in the input data stream. The circuit also includes a combining block that receives one or both of the first positive stream and first negative stream of the first differential pair and one or both of the second positive stream and second negative stream of the second differential pair and combines the received streams to generate a return-to-zero control signal for controlling a modulator. The return-to-zero control signal has a first value for representing logical ones that appear in the input data stream, a second value for representing a zero value; and a third value for representing logical zeros that appear in the input data stream.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Figure 2:
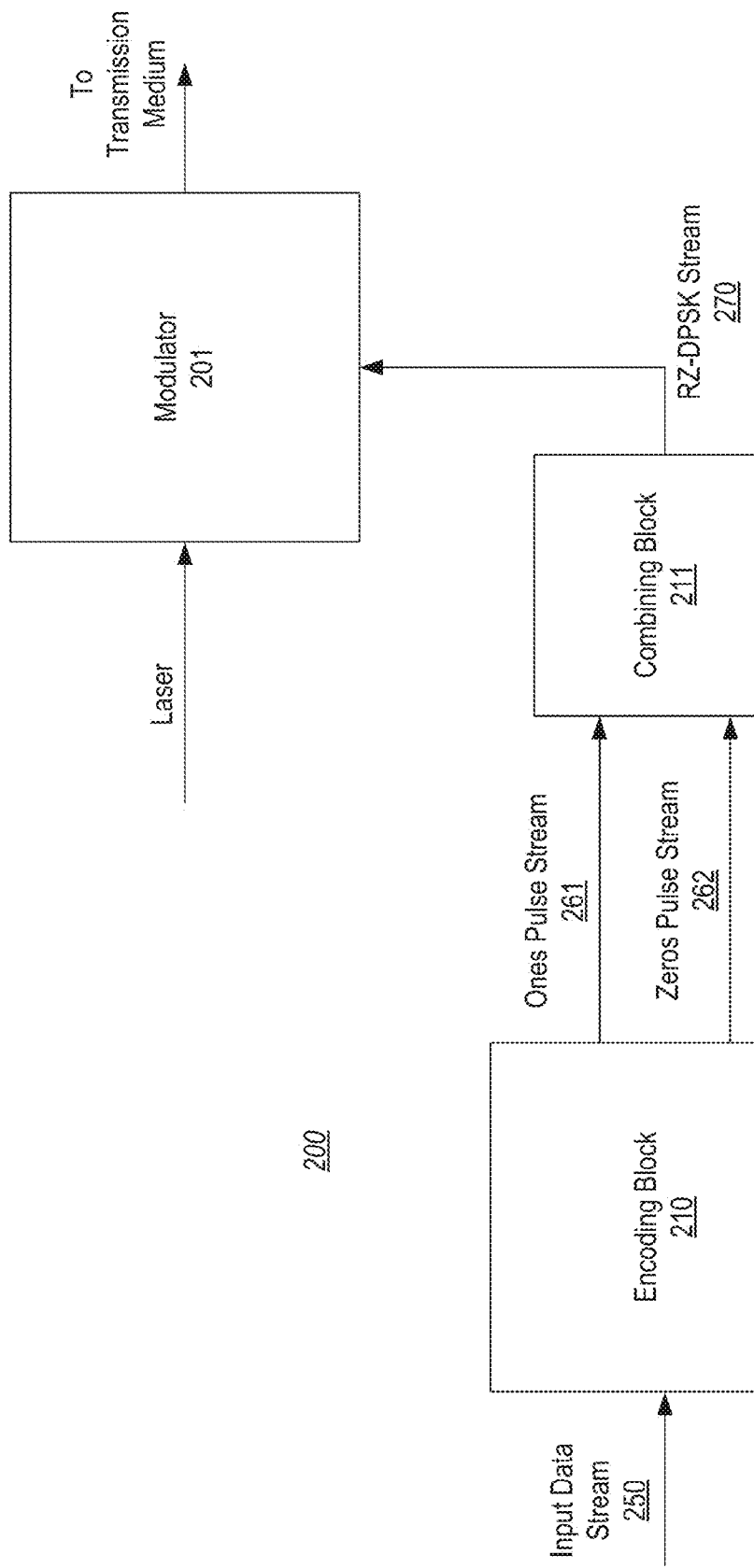
FIG. 2 illustrates a diagram of an example circuit for modulating an optic signal using a single data signal with an embedded clock to create an RZ-DPSK waveform in accordance with one or more embodiments of the invention.

FIG. 2 illustrates a diagram of an example circuit 200 for modulating an optic signal using a single data signal with an embedded clock to create an RZ-DPSK waveform in accordance with one or more embodiments of the invention. Circuit 200 includes an encoding block 210 and a combining block 211. Encoding block 210 comprises appropriate circuitry for receiving an input data stream 250 and converting it into a ones pulse stream 261 and a zeros pulse stream 262. In some implementations, encoding block 210 can be an FPGA. Combining block 211 comprises appropriate circuitry for combining zeros pulse stream 262 and ones pulse stream 261 to generate an RZ-DPSK stream 270 having a tri-level return-to-zero format.

Figure 3:
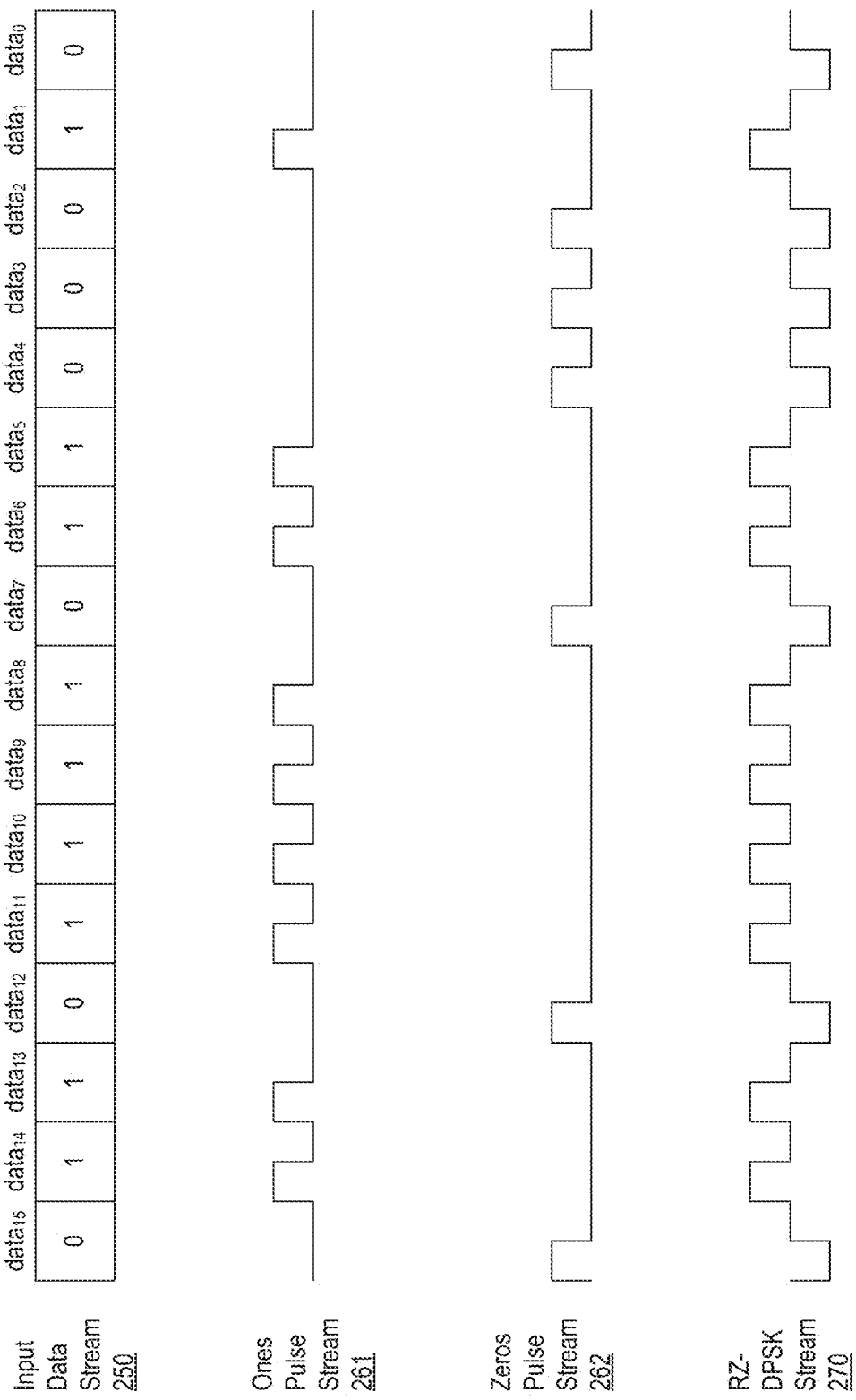
FIG. 3 illustrates example data streams to represent how an input data stream is converted into a ones pulse stream and a zeros pulse stream and how the ones and zeros pulse streams are combined into an RZ-DPSK stream.

As shown in FIG. 3, input data stream 250 comprises a stream of binary values representing data to be transmitted using an optic transmission medium. Input data stream 250, in this example, represents a data stream after DPSK encoding has been performed. In the example shown in FIG. 3, it is assumed that 16 bits of data are input to encoding block 210 at a time (e.g. in parallel). Encoding block 210 is configured to convert the bits of input data stream 250 into two serial data streams: ones pulse stream 261 and zeros pulse stream 262.

As shown in FIG. 3, ones pulse stream 261 is set high for each "1" in input data stream 250 and is set low for each "0" in input data stream 250. On the other hand, zeros pulse stream 262 is set low for each "1" in input data stream 250 and is set high for each "0" in input data stream 250.

As also shown in FIG. 3, for each bit in ones pulse stream 261 and zeros pulse stream 262, the stream returns to its low value. In other words, each bit is represented as values for two cell times: (1) the initial value which is dependent on the value of input data stream 250; and (2) the subsequent low value. The two values of each bit can therefore be determined in accordance with the following tables:

| Value of Bits in Ones Pulse Stream 261 | | |
| --- | --- | --- |
| Bit in Input Data Stream 250 | Value of bit for first cell time | Value of bit for second cell time |
| 0 | 0 | 0 |
| 1 | 1 | 0 |

| Value of Bits in Zeros Pulse Stream 262 | | |
| --- | --- | --- |
| Bit in Input Data Stream 250 | Value of bit for first cell time | Value of bit for second cell time |
| 0 | 1 | 0 |
| 1 | 0 | 0 |

Figure 2A:
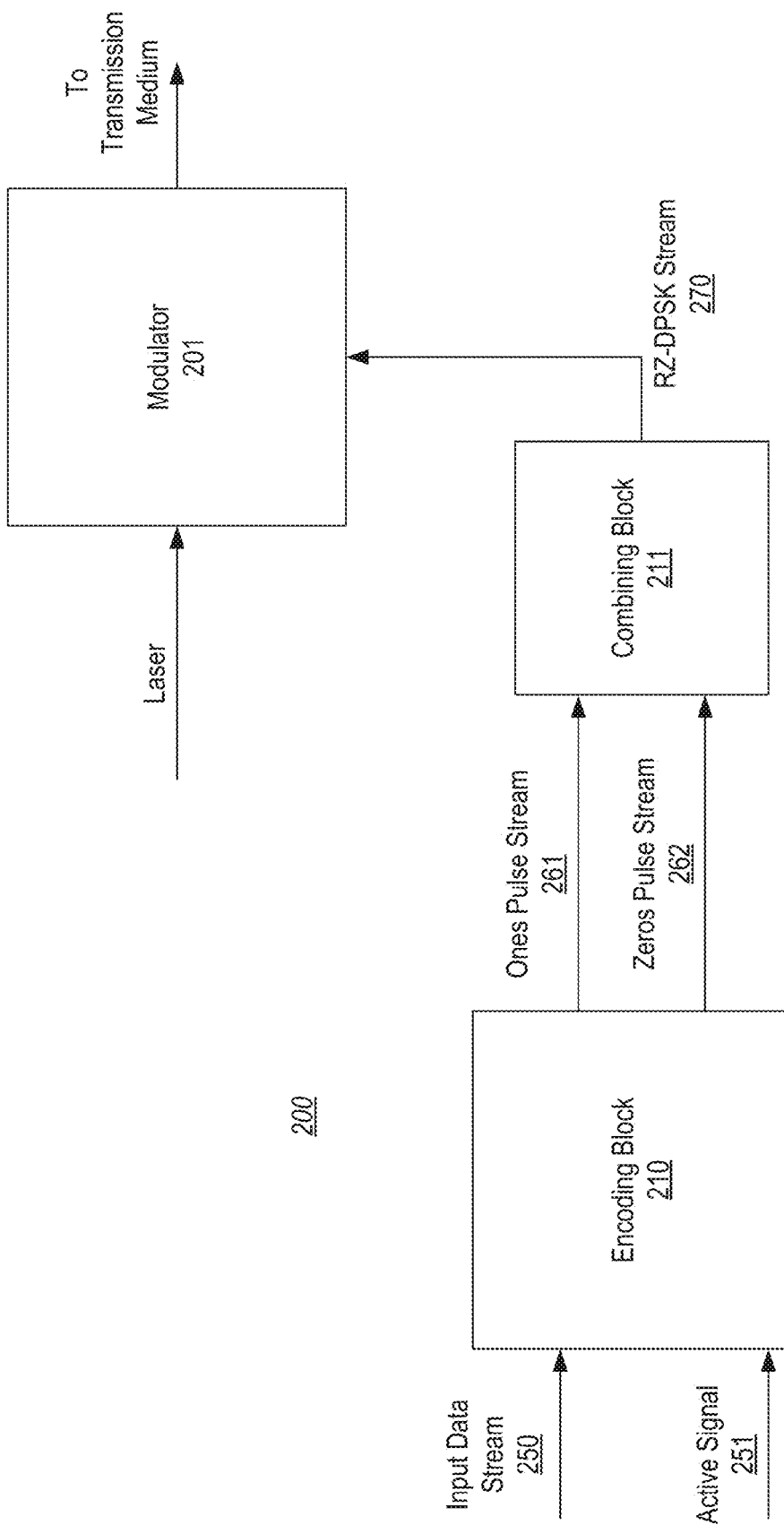
FIG. 2A illustrates a variation of the circuit of FIG. 2 where an active signal is employed.
Figure 3A:
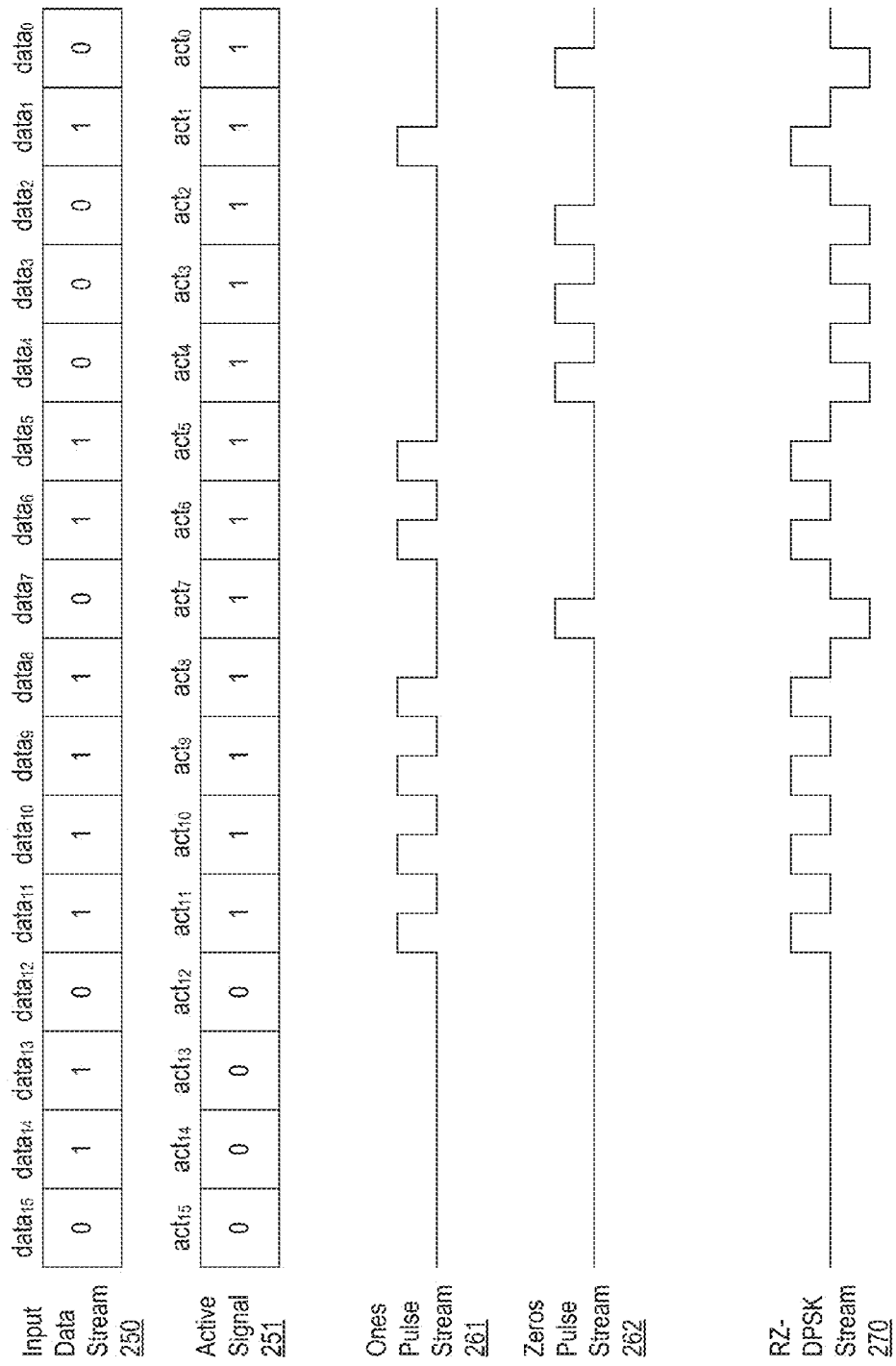
FIG. 3A illustrates the example data streams of FIG. 3 when an active signal is employed.

As shown in FIGS. 2A and 3A, in some implementations of the present invention, an active signal 251 can be provided to encoding block 210. Active signal 251 controls when ones pulse stream 261 and zeros pulse stream 262 will be raised high in response to 1s and 0s in input data stream 250 respectively. When active signal 251 is low, the value of the corresponding bit in ones pulse stream 261 and zeros pulse stream 262 will remain low for both cell times (i.e. when active signal 251 is low, input data stream 250 has no effect on ones pulse stream 261 or zeros pulse stream 262). When active signal 251 is high, the value of the corresponding bit in ones pulse stream 261 and zeros pulse stream 262 is determined as described above.

Accordingly, when active signal 251 is employed, the value of each bit in the ones and zeros pulse streams can be determined in accordance with the following tables:

| Value of Bits in Ones Pulse Stream 261 | | | |
|---|---|---|---|
| Bit in Input Data Stream 250 | Bit in Active signal 251 | Value of bit for first cell time | Value of bit for second cell time |
| 0 | 0 | 0 | 0 |
| 1 | 0 | 0 | 0 |
| 0 | 1 | 0 | 0 |
| 1 | 1 | 1 | 0 |

| Value of Bits in Zeros Pulse Stream 262 | | | |
|---|---|---|---|
| Bit in Input Data Stream 250 | Bit in Active signal 251 | Value of bit for first cell time | Value of bit for second cell time |
| 0 | 0 | 0 | 0 |
| 1 | 0 | 0 | 0 |
| 0 | 1 | 1 | 0 |
| 1 | 1 | 0 | 0 |

By employing active signal 251, a bursted optic signal can be transmitted. A bursted optic signal is one that includes bursts of data. These bursts can be created by cycling active signal 251 from its off (e.g. "0") state to its on (e.g. "1") state thereby creating gaps between bursts of data. A bursted optic signal can be preferred in some implementations because it has range advantages over non-bursted optic waveforms.

Regardless of whether active signal 251 is employed, ones pulse stream 261 and zeros pulse stream 262 are provided to combining block 211. Combining block 211 combines zeros pulse stream 262 and ones pulse stream 261 in a manner that yields an appropriate tri-level stream. As shown in FIGS. 3 and 3A, the result of combining zeros pulse stream 262 and ones pulse stream 261 is a tri-level RZ-DPSK stream 270.

As with ones pulse stream 261 and zeros pulse stream 262, RZ-DPSK stream 270 also returns to its zero value for the second cell of each bit. In this way, RZ-DPSK stream 270 embeds the clock with the data. In other words, because RZ-DPSK stream 270 returns to its zero value for each bit, it will also transition to high or low at the leading edge of each bit. These transitions represent the clock.

Although this example describes stream 270 as an RZ-DPSK stream, it can also represent an RZ-BPSK stream in embodiments where an RZ-BPSK signal is desired. Similarly, stream 270 can represent one half of an RZ-DQPSK or RZ-QPSK signal in embodiments where such signals are desired.

For additional clarity, the following example will be provided where an FPGA is used to generate ones pulse stream 261 and zeros pulse stream 262. In many FPGAs, output signals can be generated that vary between a high and low voltage level that is based on a reference voltage for the FPGA. For example, the high voltage may be 4 V DC and the low voltage may be 2 V DC. The use of 4 V and 2 V DC in this example is entirely arbitrary. These values are used for ease of illustration even though FPGAs typically do not employ such voltages.

Using 2 V and 4 V DC as example voltages, ones pulse stream 261 will be set to 4 V DC for a first cell time and return to 2 V DC for a second cell time for each 1 in input data stream 250. For each 0 in input data stream 250, ones pulse stream 261 will remain at 2 V DC for both cell times. Similarly, zeros pulse stream 262 will be set to 4 V DC for a first cell time and return to 2 V DC for a second cell time for each 0 in input data stream 250. For each 1 in input data stream 250, zeros pulse stream 262 will remain at 2 V DC for both cell times.

Figure 3B:
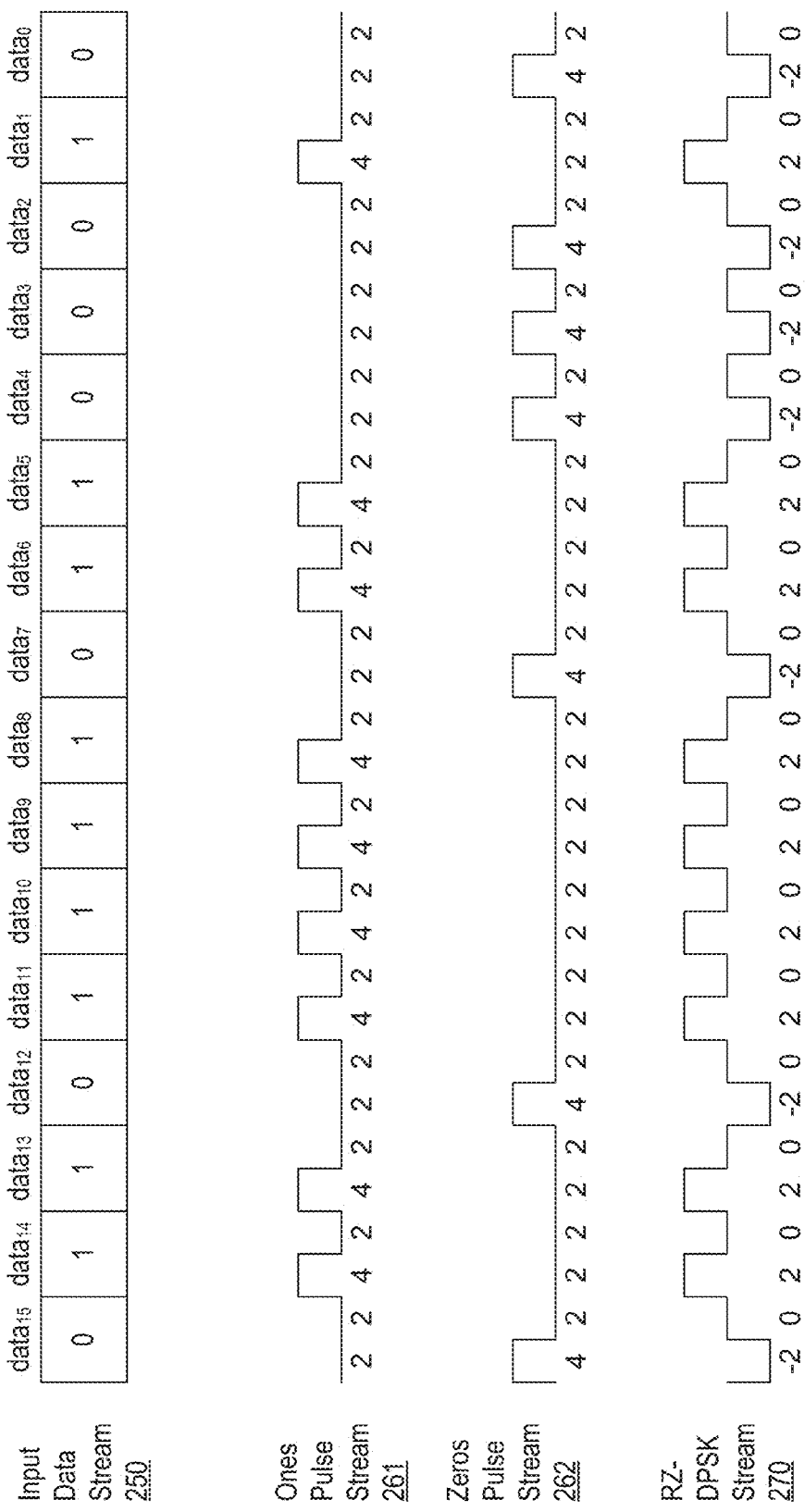
FIG. 3B illustrates the example data streams of FIG. 3 when example voltages are used.

FIG. 3B represents the application of these example voltages to FIG. 3. As shown, when zeros pulse stream 262 is combined with ones pulse stream 261 (which, in this case, involves subtracting zeros pulse stream 262 from ones pulse stream 261), three voltages are generated: 2 V DC for each 1, 0 V DC as the zero value of the return-to-zero stream, and −2 V for each 0.

As will be further described below, in some embodiments, each of ones pulse stream 261 and zeros pulse stream 262 can be generated as differential pairs. In such cases, the negative (or inverse) stream of the differential pair can be employed for one or both of ones pulse stream 261 and zeros pulse stream 262. In such cases, the operation employed by combining block 211 can be modified to yield the proper combination. For example, if the negative stream is employed for zeros pulse stream 262 (which is the case in some of the examples given below), combining block 211 can add zeros pulse stream 262 to ones pulse stream 261 to create the tri-level RZ-DPSK stream 270.

Figure 3C:
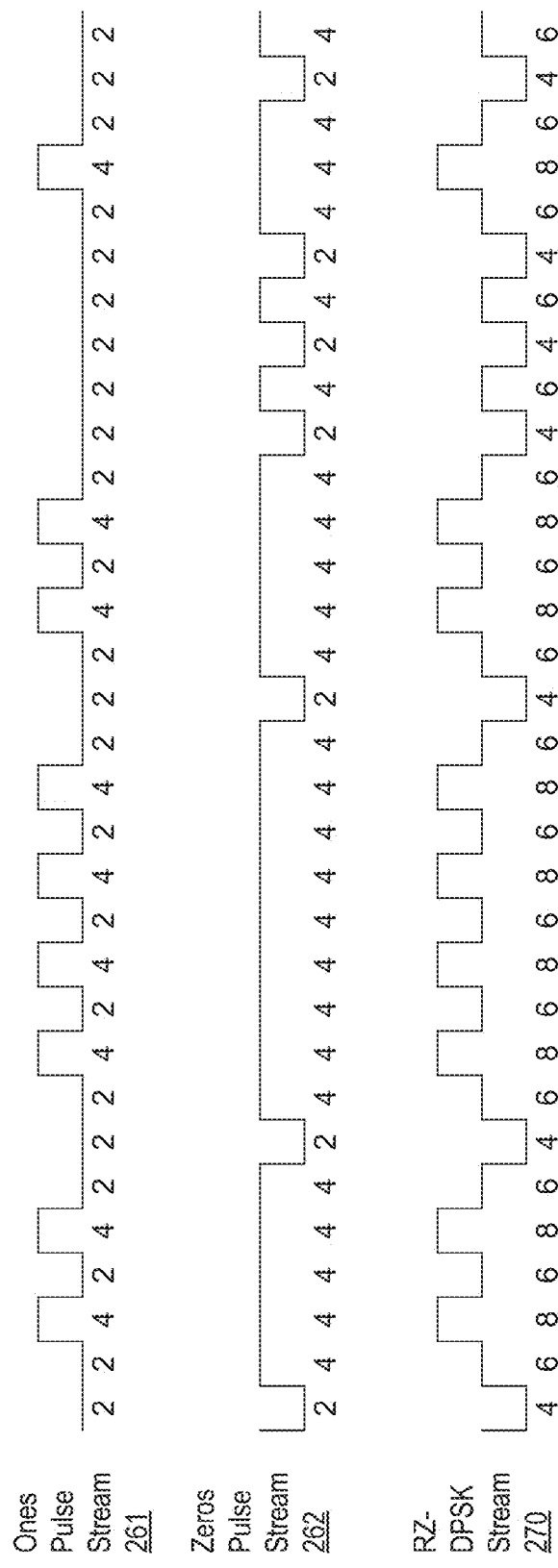
FIG. 3C illustrates the example data streams of FIG. 3 when a negative stream of a differential pair is employed as the zeros pulse stream.

FIG. 3C illustrates the case where zeros pulse stream 262 comprises the negative stream of a differential pair. As can be seen, zeros pulse stream 262 in FIG. 3C is the inverse of zeros pulse stream 262 in FIG. 3B (i.e. in FIG. 3C, zeros pulse stream 262 pulses low for each 0 in input data stream 250). Because the negative stream is employed for zeros pulse stream 262, zeros pulse stream 262 can be added to ones pulse stream 261 to generate RZ-DPSK stream 270. In particular, adding the two streams yields values of 4 V DC for each 0, 6 V DC for the zero value, and 8 V DC for each 1.

The examples given above are exemplary only and are intended to provide a simplified overview of how a ones pulse stream and a zeros pulse stream can be used to create a tri-level RZ-DPSK stream for controlling an electro-optic modulator. As will be further described below, various different configurations can be employed for combining block 211. A particular configuration can be selected based on which stream or streams of a differential pair are used.

However, the present invention is not limited to using a stream of a differential pair. The use of a differential pair is provided as a practical example because many suitable FPGAs include multi gigabit SERDES ("SERializer/DESerializer") blocks which are capable of outputting serial streams at high speeds. These multi gigabit SERDES blocks output differential pairs. Other output blocks could also be used whether or not they output differential pairs.

Figure 4A:
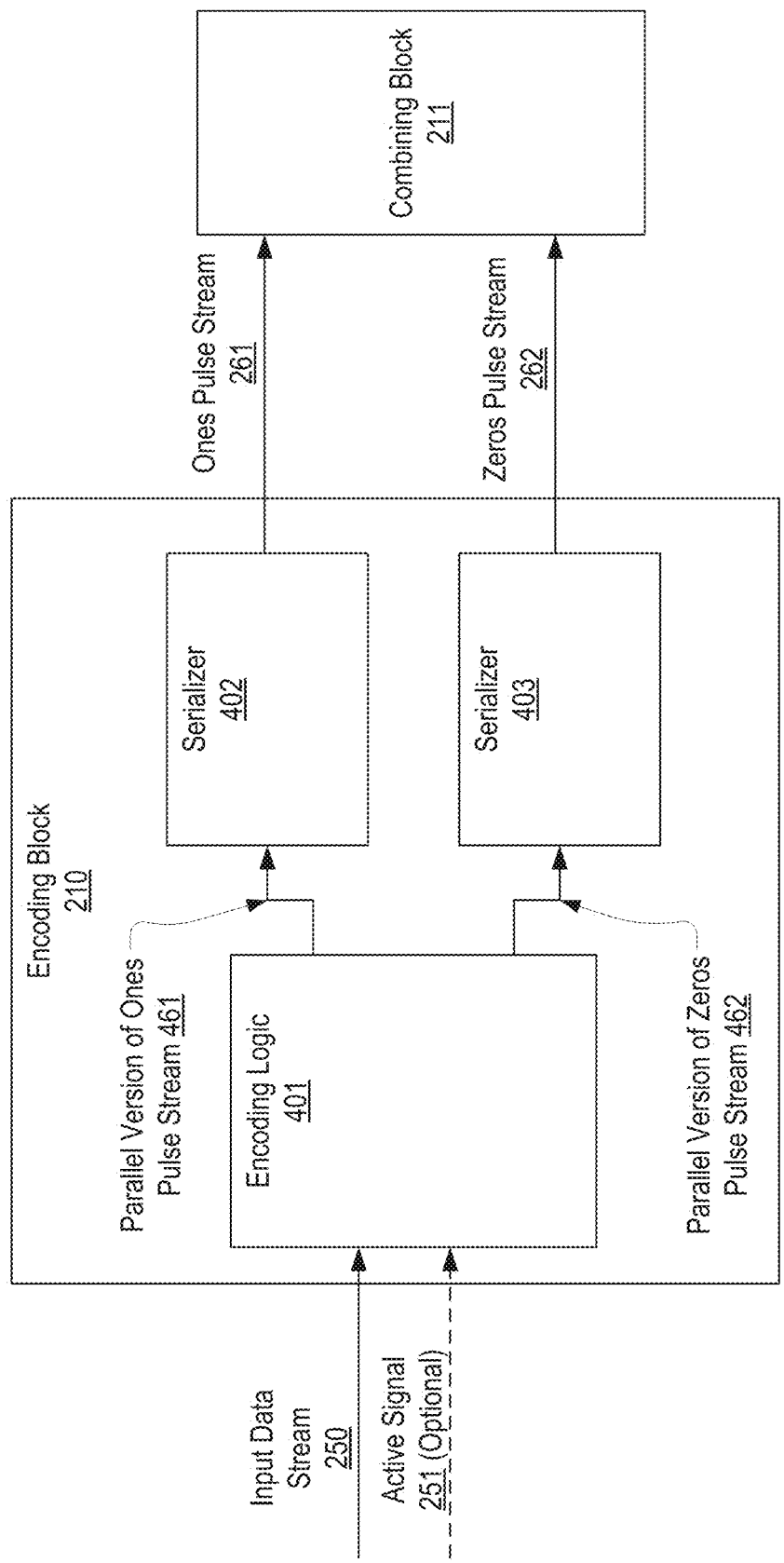
FIG. 4A illustrates an example of how an encoding block of the example circuit can be implemented.
Figure 4B:
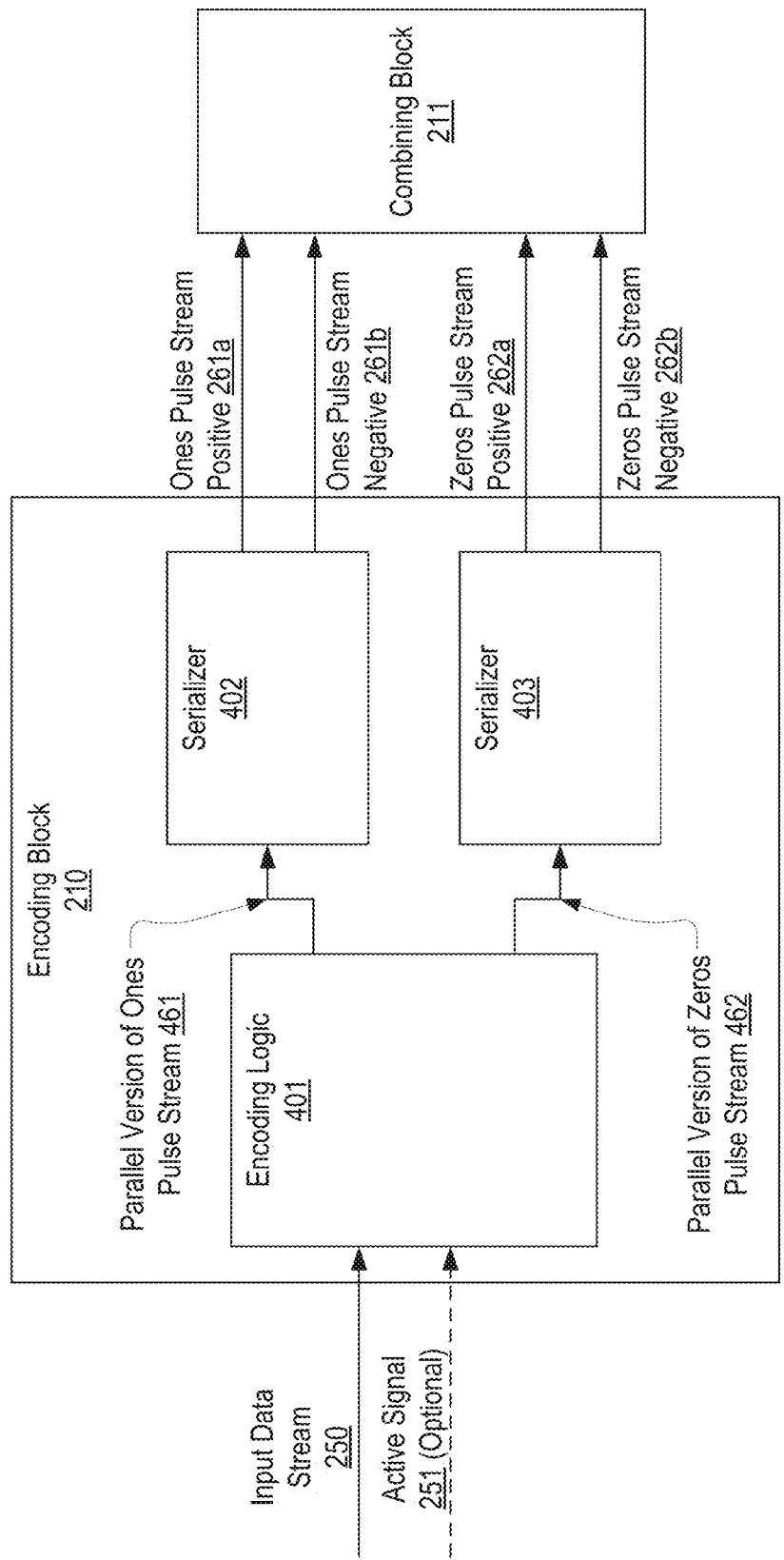
FIG. 4B illustrates an example of how an encoding block of the example circuit can be implemented when the encoding block generates differential signals for the ones and zeros pulse streams.

FIGS. 4A and 4B each provide an example of a suitable configuration for encoding block 210. In each figure, encoding block 210 includes encoding logic 401 and two serializers: serializer 402 for generating ones pulse stream 261, and serializer 403 for generating zeros pulse stream 262. FIGS. 4A and 4B differ in that, in FIG. 4B, serializers 402 and 403 output differential pairs rather than a single stream.

Figure 5:
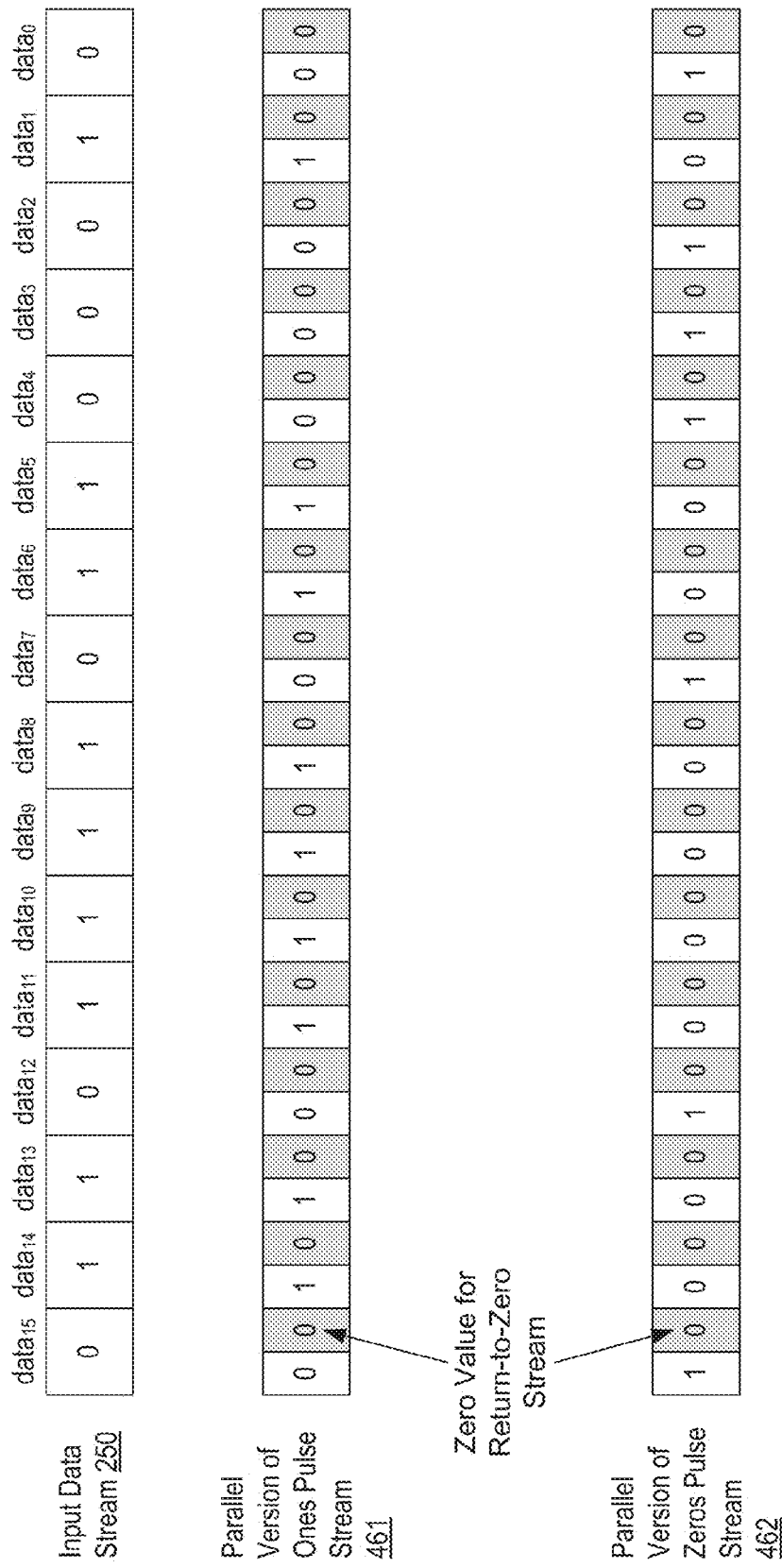
FIG. 5 illustrates how the encoding block can generate parallel versions of a ones and zeros pulse stream from the example input data stream of FIG. 3.
Figure 5A:
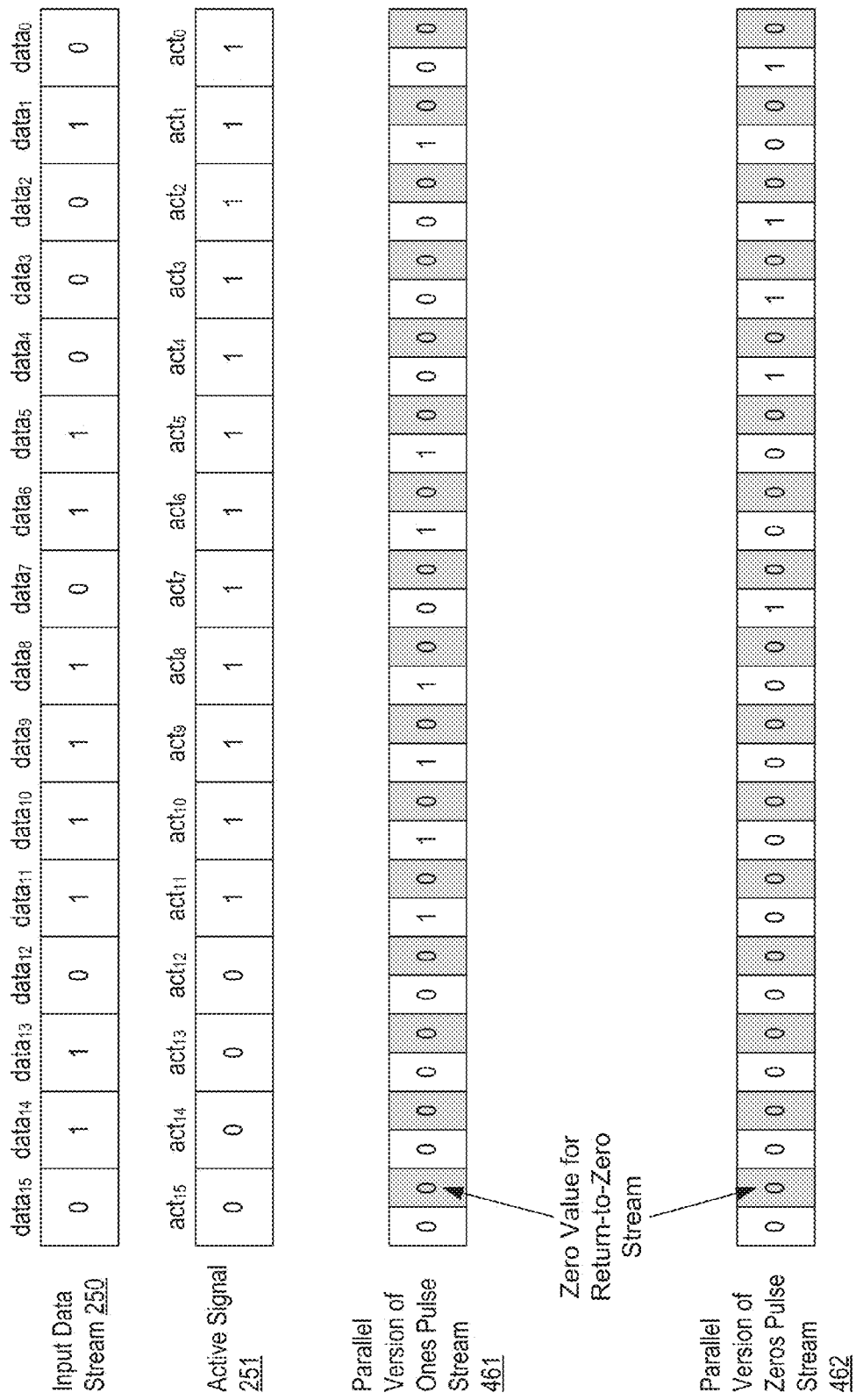
FIG. 5A illustrates how the encoding block can generate parallel versions of a ones and zeros pulse stream from the example input data stream of FIG. 3 when an active signal is employed.

Encoding logic 401 receives input data stream 250 and generates parallel versions of ones pulse stream 461 and zeros pulse stream 462. Parallel versions 461 and 462 contain the same data as ones pulse stream 261 and zeros pulse stream 262 respectively with the difference being that parallel versions 461 and 462 have not been serialized. FIG. 5 illustrates an example of parallel versions 461 and 462 when generated from the example input data stream 250 of FIG. 3, while FIG. 5A corresponds to the example of FIG. 3A when active signal 251 is employed. As labeled in FIG. 5, encoding logic 401 adds a 0 in between each data bit in input data stream 250. Therefore, parallel versions 461 and 462 include twice as many bits as input data stream 250. In this example, parallel versions 461 and 462 each include 32 bits for each 16 bits of input data stream 250. However, any other suitable word size could be used, and the particular word size may be selected based on the capabilities of serializers 402 and 403.

Encoding logic 401 outputs parallel version 461 to serializer 402 and parallel version 462 to serializer 403. Serializers 402 and 403 serialize parallel versions 461 and 462 into ones pulse stream 261 and zeros pulse stream 262 respectively such that serial streams are provided to combining logic 211.

Figure 3D:
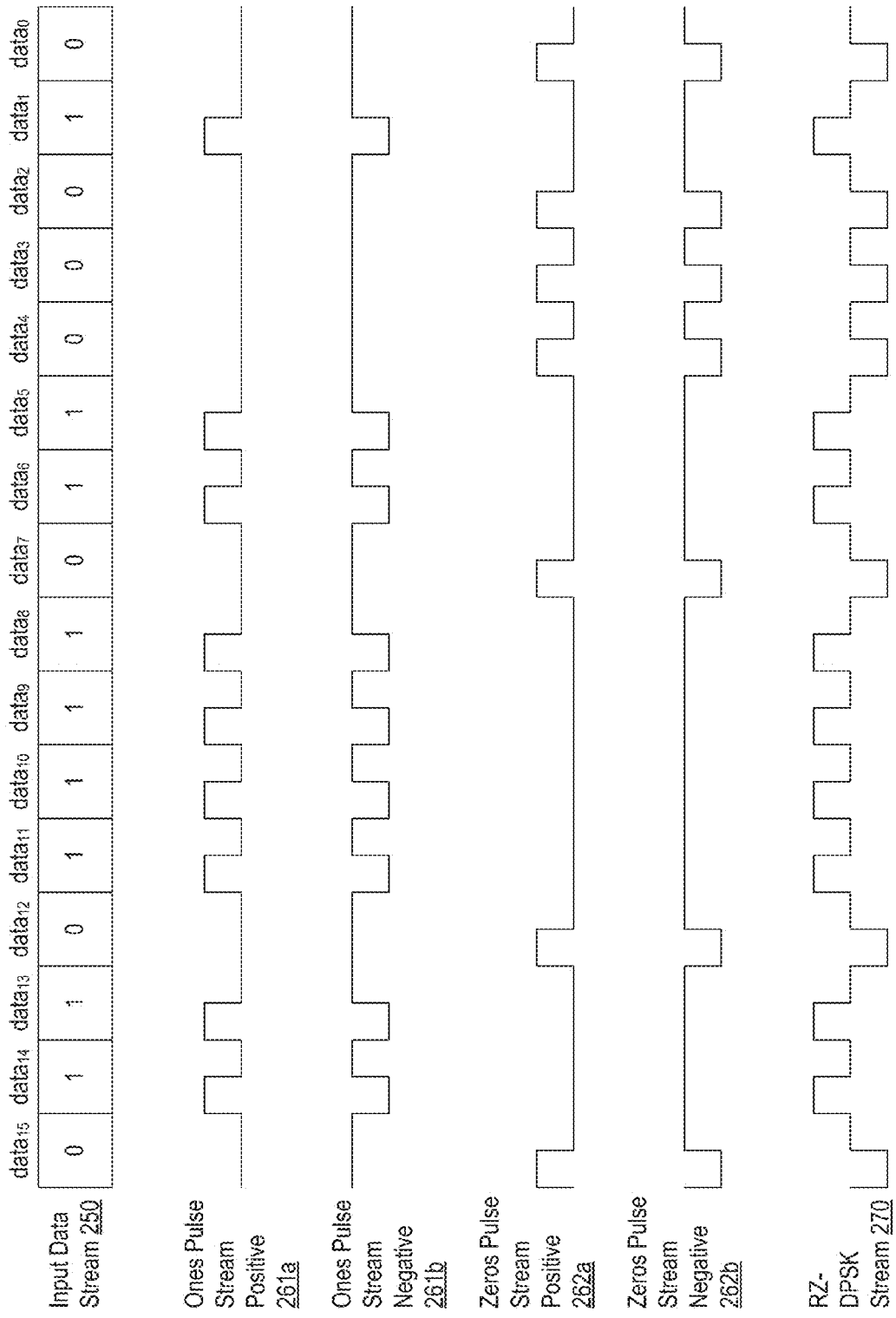
FIG. 3D illustrates the example data streams of FIG. 3 when differential pairs are used for both the ones and the zeros data streams.

FIG. 4B illustrates the case when serializers 402 and 403 output differential pairs. As described above, differential pairs are inverse pairs of an output stream. FIG. 3D illustrates an example of these differential pairs in the context of the example of FIG. 3. As described below, one or both of the streams of a differential pair may be employed for generating RZ-DPSK stream 270.

Figure 6A:
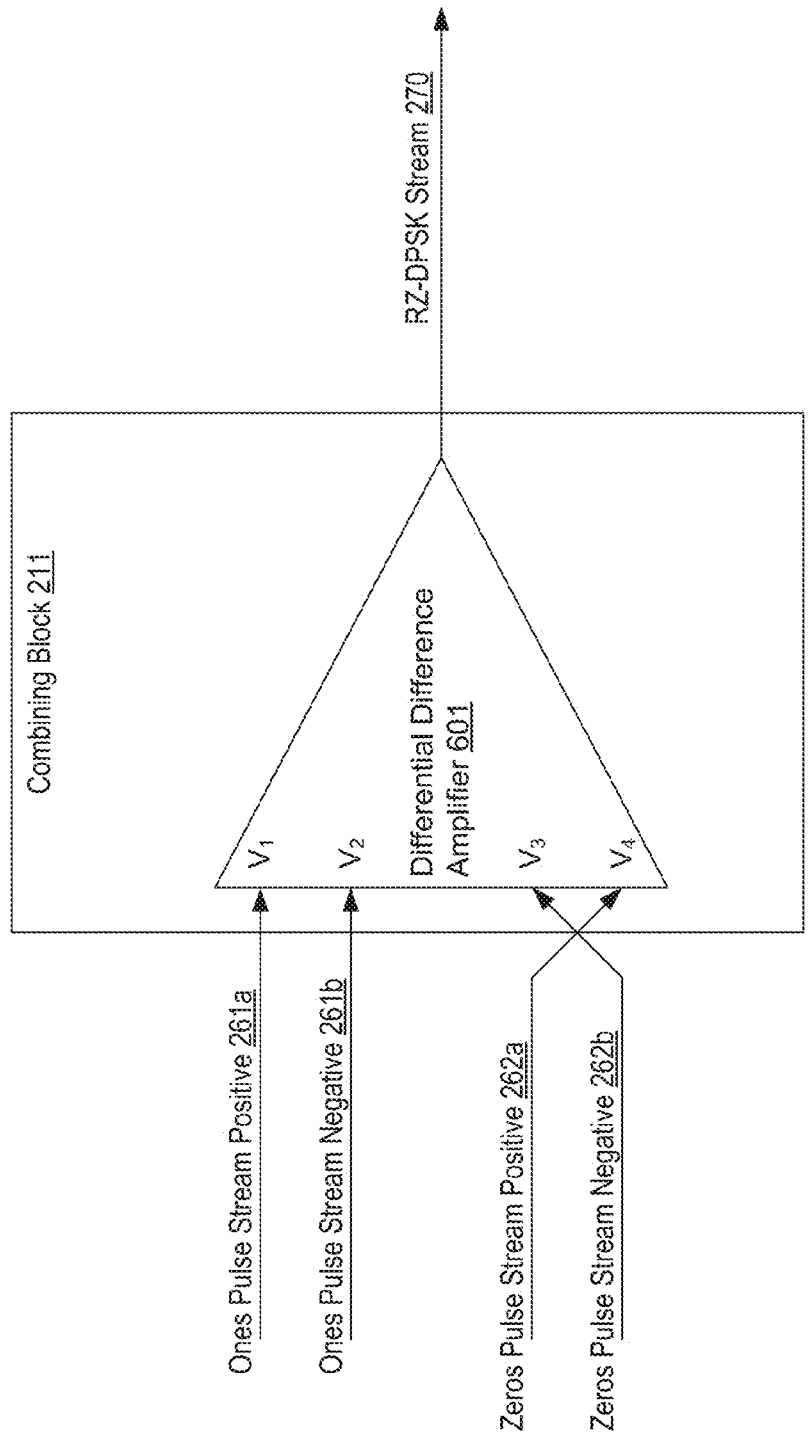
FIG. 6A illustrates a first example of how a combining block of the example circuit can be implemented when differential signals are employed.
Figure 6B:
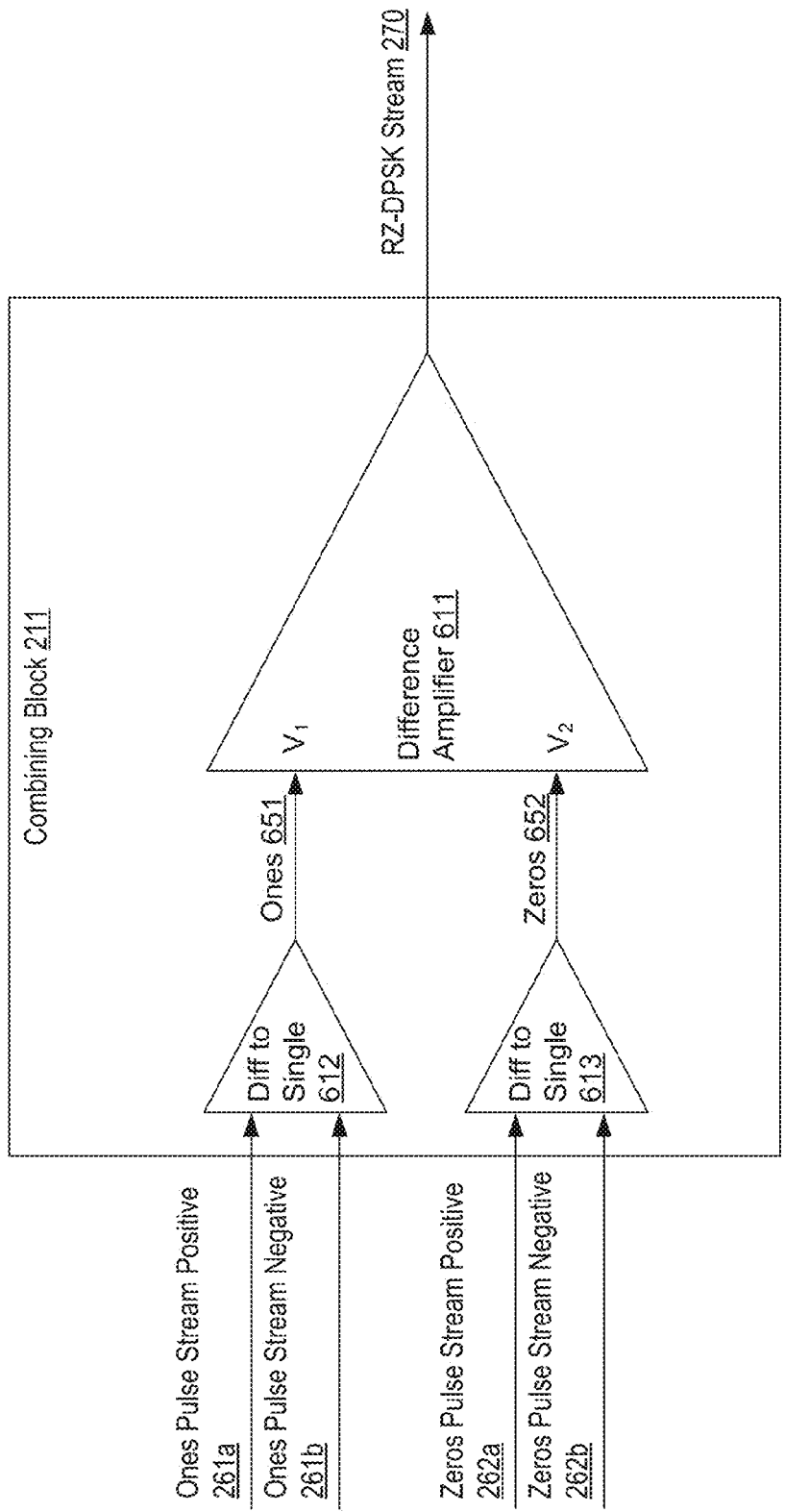
FIG. 6B illustrates a second example of how a combining block of the example circuit can be implemented when differential signals are employed.
Figure 6C:
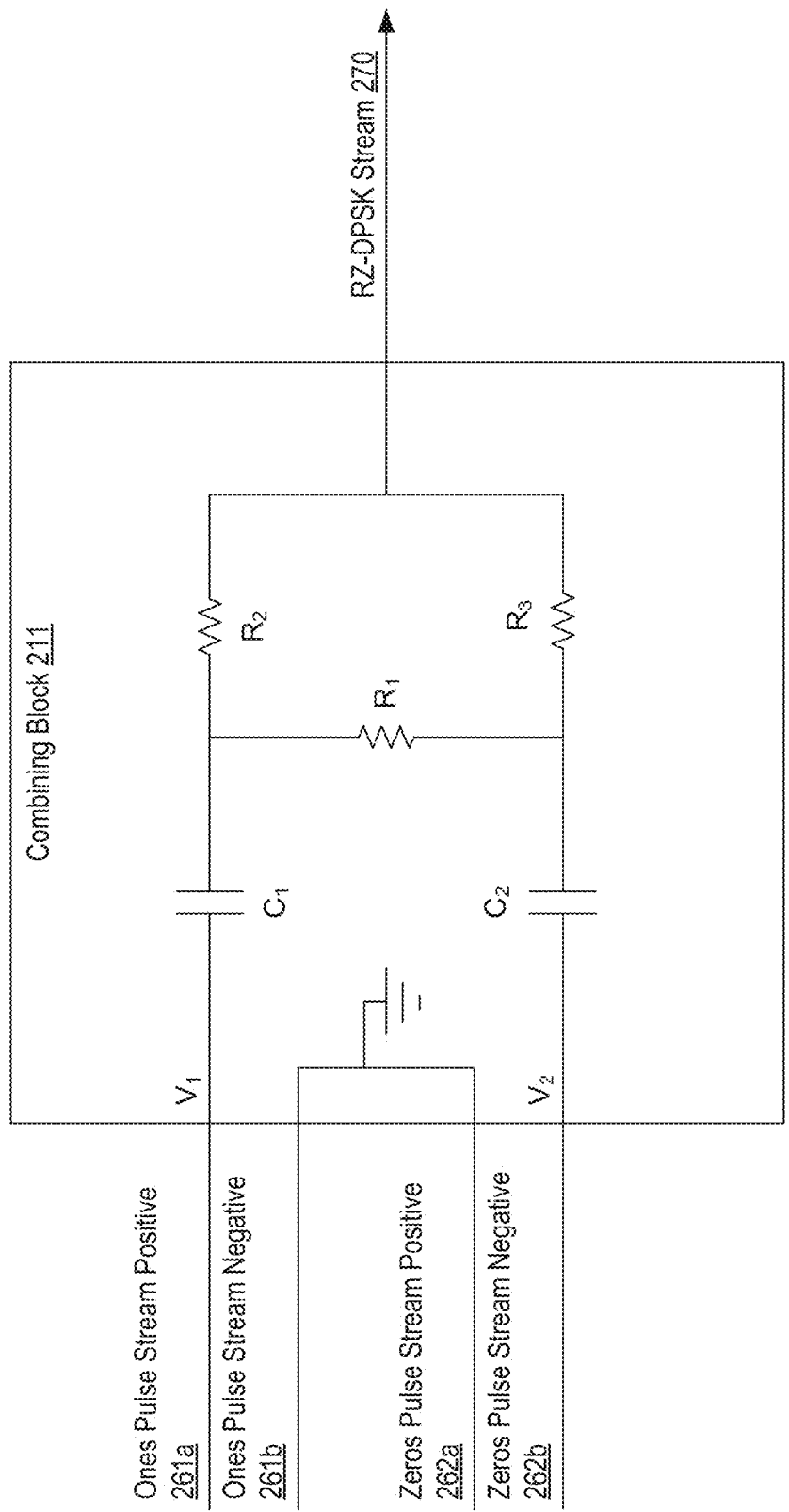
FIG. 6C illustrates a third example of how a combining block of the example circuit can be implemented when differential signals are employed.

Combining logic 211 can be configured to receive the outputs of serializers 402 and 403 and combine them in a manner that generates the tri-level RZ-DPSK stream 270. When serializers 402 and 403 output differential pairs, the particular configuration of combining logic 211 can be based on which streams of the differential pairs will be used to generate RZ-DPSK stream 270. FIGS. 6A-6C each provide an example of a configuration of combining logic 211 when serializers 402 and 403 output differential pairs. However, other configurations can also be employed.

FIG. 6A illustrates an example where combining block 211 comprises a differential difference amplifier 601 that receives all four streams of the differential pairs output by serializers 402 and 403. In simplified terms, the output value of differential difference amplifier 601 (i.e. the value of RZ-DPSK stream 270) is based on the equation $g(V_1-V_2+V_3-V_4)$ where g represents the gain of the amplifier and $V_1$-$V_4$ are the voltages of the four input streams 261a, 261b, 262b, 262a respectively. Using the example in FIG. 3D and assuming the high voltage is 4 V DC and the low voltage is 2 V DC, this equation yields $g(2-4+2-4)=g(-4)$ V DC for the first cell of the first bit. The −4 therefore represents the 0 value of the first bit. Similarly, for the second cell of the first bit, the equation yields $g(2-2+2-2)=g(0)$ V DC, the zero value for the tri-level return-to-zero stream. For the first cell of the second bit, the equation yields $g(4-2+4-2)=g(4)$ V DC. The +4 therefore represents the 1 value of the second bit.

FIG. 6B illustrates an example where combining block 211 includes two differential to single ended converters 612, 613 for converting differential pairs 261a/261b and 262a/262b respectively into a single stream: ones stream 651 and zeros stream 652 respectively. Difference amplifier 611 can amplify the difference between ones stream 651 and zeros stream 652 to yield the tri-level RZ-DPSK stream 270. In simplified terms, differential to single ended converters 612 and 613 can generate ones stream 651 and zeros stream 652 by subtracting the negative stream from the positive stream. In other words, ones stream 651 can comprise the result of subtracting ones pulse stream negative 261b from ones pulse stream positive 261a, and zeros stream 652 can comprise the result of subtracting zeros pulse stream negative 262b from zeros pulse stream positive 262a. Difference amplifier 611 can then amplify the difference between ones stream 651 and zeros stream 652 based on the equation $g(V_1-V_2)$. Using the example in FIG. 3D and again assuming the high voltage is 4 V DC and the low voltage is 2 V DC, the first value in ones stream 651 would be $g(2-4)=g(-2)$ V DC and the first value in zeros stream 652 would be $g(4-2)=g(2)$ V DC. Difference amplifier 611 would then generate a corresponding first value for RZ-DPSK stream 270 of $g(-2-2)=g(-4)$ V DC to represent the 0 value of the first bit of input data stream 250. Continuing this example, the return-to-zero value (e.g. the value of the second cell of the first bit) would be $g((2-4)-(2-4))=g(0)$ V DC. Finally, to represent the 1 value of the second bit of input data stream 250, difference amplifier 611 would output $g((4-2)-(2-4))=g(4)$ V DC.

FIG. 6C illustrates an example where combining block 211 comprises a resistive combiner that only employs ones pulse stream positive 261a and zero pulse stream negative 262b. For simplicity, the value of RZ-DPSK stream 270 can be represented as $V_1+V_2$. Using the example in FIG. 3D and again assuming the high voltage is 4 V DC and the low voltage is 2 V DC, the first value of RZ-DPSK stream 270 would be 2+2=4 V DC, representing the 0 value of the first bit in input data stream 250. The second value would be 2+4=6 V DC, representing the zero value of the return-to-zero stream. The third value would be 4+4=8 V DC, representing the 1 value of the second bit of input data stream 250.

The example configuration of combining block 211 depicted in FIG. 6C can also be used when differential pairs are not employed. For example, an FPGA (e.g. encoding block 401) can be configured to generate two streams similar to ones pulse stream positive 261a and zeros pulse stream negative 262b which can then be combined with the resistive combiner as described above.

Another example configuration of combining block 211 when differential pairs are not employed includes a difference amplifier (e.g. similar to FIG. 6B but without differential to single ended converters 612 and 613). For example, ones pulse stream 261 and zeros pulse stream 262 could be supplied as inputs to a difference amplifier to yield tri-level RZ-DPSK stream 270. Accordingly, although the example configurations of combining block 211 shown in FIGS. 6A-6C each relate to the use of differential pairs, the present invention is not limited to the use of differential pairs but should encompass the use of separate ones and zeros pulse streams whether or not differential pairs are employed.

Returning to FIG. 2, RZ-DPSK stream 270 is input to modulator 201 to control the modulation of the laser in accordance with the tri-level return-to-zero stream. For each of the tri-level values in RZ-DPSK stream 270, modulator 201 can modulate the laser with a different phase, amplitude, or other characteristic depending on the particular implementation of the modulator. Because RZ-DPSK stream 270 is a single stream, only a single modulator is required to modulate the laser with both data and clock. Therefore, a system that employs the techniques of the present invention can include fewer components than prior systems which modulate the clock separately from the data using two modulators.

Also, because encoding block 210 can be implemented in an FPGA, the analog path of the control stream is greatly reduced. In other words, only a simple combining block 211 is needed to generate RZ-DPSK stream 270.

Figure 1:
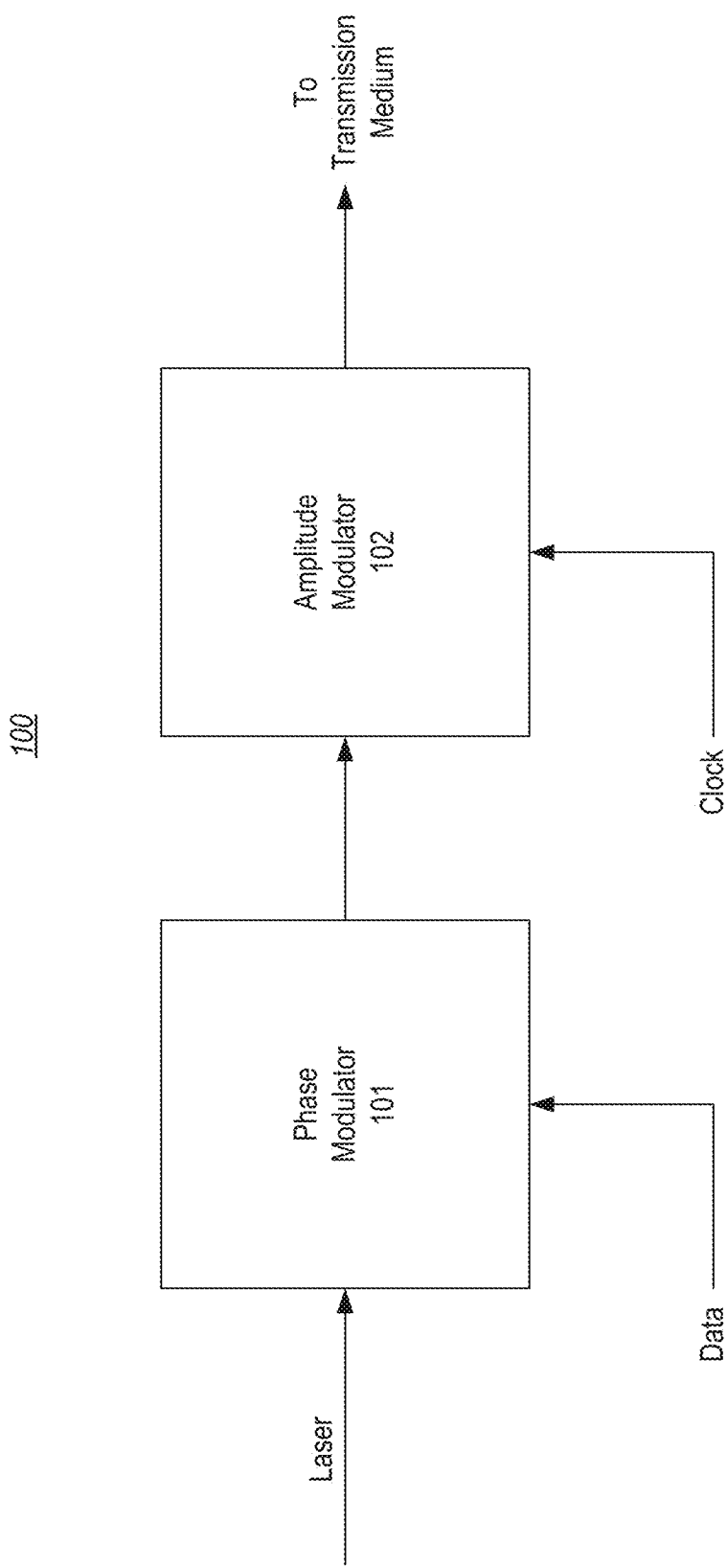
FIG. 1 illustrates a diagram of an example prior art circuit for modulating an optic signal with separate data and clock signals to create an RZ-DPSK waveform.

Further, because the clock is embedded within the data stream (i.e. within RZ-DPSK stream 270), there is no need for external (or analog) phase alignment circuitry which further reduces the size and complexity of a system. More particularly, encoding block 210 (e.g. an FPGA with two SERDES blocks) can output ones and zeros pulse streams in alignment which are then combined into a single stream, RZ-DPSK stream 270, for modulating the laser. In contrast, when the clock and data are separately modulated as shown in FIG. 1, extensive analog circuitry is required to ensure that the clock is modulated in alignment with the previously modulated data.

Many variations of the exemplary implementations described above can be employed in accordance with embodiments of the present invention. For example, in some implementations, digital-to-analog converters can be employed in place of serializers 402 and 403 to generate the ones and zeros pulse streams. Digital-to-analog converters may be preferred in systems that employ lower data rates.

However, as described above, a multi gigabit SERDES block may be preferred in many implementations due to its ability to output serial streams at high rates. Specifically, employing two multi gigabit SERDES blocks allows the two (or four) pulse streams to be aligned even at high rates (e.g. 3 Gbits/s). Accordingly, implementing the techniques of the present invention using an FPGA with multi gigabit SERDES blocks may be preferred when a system will operate at high data rates.

Further, even though this specification is focused on generating RZ-DPSK stream 270 for controlling an electro-optic modulator, RZ-DPSK stream 270 could also be used to control other types of modulators. Additionally, although the above described embodiments have used RZ-DPSK as an example, other signals could equally be used to control a modulator including RZ-BPSK, RZ-QPSK, RZ_DQPSK, and PPM.

Although specific embodiments and applications of the invention have been described in this specification, these embodiments and applications are exemplary only, and many variations are possible.

We claim:

1. A method for generating a return-to-zero control signal for controlling a modulator, the method comprising:
receiving an input data stream;
generating a first data stream from the input data stream, the first data stream including a pulse for each logical one that appears in the input data stream;
generating a second data stream from the input data stream, the second data stream including a pulse for each logical zero that appears in the input data stream;
combining the first data stream and the second data stream to generate a third data stream, the third data stream having a first value for representing logical ones that appear in the input data stream, a second value for representing a zero value; and a third value for representing logical zeros that appear in the input data stream; and
outputting the third data stream as a return-to-zero control signal for controlling a modulator.

2. The method of claim 1, wherein the first data stream and the second data stream are serial data streams.

3. The method of claim 1, wherein the first data stream and the second data stream comprise two cell values for each bit in the input data stream, the first cell value for each bit representing a corresponding bit in the input data stream such that the first cell value can represent a pulsed or a non-pulsed value, and the second cell value for each bit representing a non-pulsed value.

4. The method of claim 1, wherein the first and second data streams are generated by an FPGA.

5. The method of claim 4, wherein the first and second data streams are generated by SERDES blocks of the FPGA.

6. The method of claim 1, wherein the SERDES blocks output differential pairs, the first data stream comprising a positive stream of a first differential pair, and the second data stream comprising a negative stream of a second differential pair.

7. The method of claim 1, wherein the third data stream is generated by one of:
a difference amplifier; or
a resistive combiner.

8. The method of claim 1, wherein the first and second data streams each comprise differential pairs, and wherein the third data stream is generated by a differential difference amplifier.

9. The method of claim 1, further comprising:
receiving an active signal;
wherein the first data stream includes a pulse for each logical one in the input data stream only when a corresponding value in the active signal is set; and
wherein the second data stream includes a pulse for each logical zero in the input data stream only when a corresponding value in the active signal is set.

10. A system for generating a return-to-zero control signal for controlling an electro-optic modulator, the system comprising:
an encoding block that is configured to receive an input data stream and generate a first data stream and a second data stream based on the input data stream, the first data stream including a pulse for each logical one in the input data stream and the second data stream including a pulse for each logical zero in the input data stream; and
a combining block that is configured to receive the first and second data streams and generate a third data stream by combining the first and second data streams, the third data stream comprising a return-to-zero control signal for controlling a modulator.

11. The system of claim 10, wherein the encoding block comprises an FPGA.

12. The system of claim 10, wherein the encoding block comprises:
encoding logic for generating a parallel version of the first data stream and a parallel version of the second data stream;
a first serializer for receiving the parallel version of the first data stream and outputting the first data stream as a serial stream; and
a second serializer for receiving the parallel version of the second data stream and outputting the second data stream as a serial stream.

13. The system of claim 12, wherein the first and second serializers are multi gigabit SERDES blocks.

14. The system of claim 12, wherein the first and second serializers output differential pairs.

15. The system of claim 14, wherein the first data stream comprises a positive stream of a first differential pair, and the second data stream comprises a negative stream of a second differential pair.

16. The system of claim 14, wherein the first data stream comprises both a positive stream and a negative stream of a first differential pair, and the second data stream comprises both a positive stream and a negative stream of a second differential pair.

17. The system of claim 16, wherein the combining block comprises a differential difference amplifier.

18. The system of claim 10, wherein the combining block comprises a difference amplifier.

19. The system of claim 10, wherein the combining block comprises a resistive combiner.

20. The system of claim 10, wherein the encoding block is configured to receive an active signal, wherein when the active signal is set, the first and second data streams include pulses for each logical one and logical zero respectively in the input data stream, and when the active signal is not set, the first and second data streams do not include pulses for any logical one or logical zero respectively in the input data stream.

21. A circuit for generating a return-to-zero control signal, the circuit comprising:
an encoding block that outputs a first differential pair, including a first positive stream and a first negative stream, each representing a first data stream and a second differential pair, including a second positive stream and a second negative stream, each representing a second data stream, the first data stream including a pulse for each logical one in an input data stream, and the second data stream including a pulse for each logical zero in the input data stream; and a combining block that receives one or both of the first positive stream and first negative stream of the first differential pair and one or both of the second positive stream and second negative stream of the second differential pair and combines the received streams to generate a return-to-zero control signal for controlling a modulator, the return-to-zero control signal having a first value for representing logical ones that appear in the input data stream, a second value for representing a zero value; and a third value for representing logical zeros that appear in the input data stream.

* * * * *